United States Patent [19]

Roofthooft et al.

[11] Patent Number: 5,147,597
[45] Date of Patent: Sep. 15, 1992

[54] PRESTABILIZED CHROMIUM PROTECTIVE FILM TO REDUCE RADIATION BUILDUP

[75] Inventors: Roger L. A. Roofthooft, Linkebeek, Belgium; Roger H. Asay, Santa Clara, Calif.

[73] Assignee: Electric Power Research Institute, Palo Alto, Calif.

[21] Appl. No.: 682,613

[22] Filed: Apr. 9, 1991

[51] Int. Cl.⁵ .............................................. G21C 19/00
[52] U.S. Cl. ................................... 376/305; 148/266
[58] Field of Search ............... 376/305, 306, 457, 414, 376/416, 900; 148/264, 265, 266; 427/5, 6, 230, 239

[56] References Cited

U.S. PATENT DOCUMENTS

| | | | |
|---|---|---|---|
| 2,760,891 | 8/1956 | Nichols | 148/266 |
| 2,991,205 | 7/1961 | Lincoln et al. | 148/264 |
| 4,297,150 | 10/1981 | Foster et al. | 376/305 |
| 4,615,913 | 10/1986 | Jones et al. | 427/226 |
| 4,636,266 | 1/1987 | Asay | 376/305 |
| 4,828,790 | 5/1989 | Honda et al. | 376/306 |

FOREIGN PATENT DOCUMENTS

| | | | |
|---|---|---|---|
| 126996 | 7/1984 | Japan | 376/305 |
| 69979 | 4/1986 | Japan | 148/266 |

Primary Examiner—Daniel D. Wasil
Attorney, Agent, or Firm—Limbach & Limbach

[57] ABSTRACT

The buildup of radioactive contaminants on the inside surface of light water reactor water systems is retarded by the use of a chromium coating of at least five hundred Angstroms on the surface exposed to the water system. The chromium coating is then passivated by exposure to an oxygen source for about five hours at a temperature between 150° C. and 450° C.

3 Claims, 3 Drawing Sheets

PRESTABILIZED CHROMIUM PROTECTIVE FILM TO REDUCE RADIATION BUILDUP

TECHNICAL FIELD

This invention relates generally to a method of reducing the buildup of radioactive materials on the surface portions of pipes and vessels used in the water system of a light water type nuclear reactor. More specifically, this invention relates to the use of a chromium film on the surface of the steel or stainless steel pipes and vessels used in the water system.

BACKGROUND OF THE INVENTION

The main source of occupational exposure for workers in the nuclear industry is the dose of radiation received during routine maintenance which is performed on primary system components and equipment. The radiation level for these components results from the deposition of activated corrosion products on the interior surfaces of the system components. The corrosion products result from the release of cobalt atoms from the steel into the water system where the cobalt atoms are subjected to conditions which lead to the formation of radioactive isotope Co 59. Subsequently, these activated molecules are deposited as a film on the surface. The deposition of radioactive materials is permanent in that these activated corrosion products are incorporated into the oxide film on the pipe or vessel inside surface as a tightly adhering layer. Removal of these activated corrosion products requires chemical or physical removal techniques and cannot be performed while the plant is operating.

There is a recent trend to substantially reduce worker exposure. One method of minimizing occupational exposure has been to prevent the deposition of activated corrosion products on the interior surfaces of the water system components by protecting these surfaces with a film or coating. Several thin film methods have been studied within the nuclear industry with varying degrees of success. A reduction of the true surface area of the internal components by surface polishing has proven to be helpful. U.S. Pat. No. 4,636,266 describes a process for pre-oxidizing or passivating the highly polished internal surface. This technology is being applied to new components as they are needed in new or existing nuclear plants. Another technique has been developed by General Electric Company involving the use of zinc in the water system to inhibit the growth of films containing active cobalt corrosion products.

The present invention for the first time provides a metallic coating to reduce the level of radioactive isotope retained on the inside surfaces of water system piping and vessels. Based upon the experiments performed to date, the present invention provides a factor of ten reduction in the level of retained radioactive species.

SUMMARY OF THE INVENTION

In accordance with an embodiment of the present invention, a method for retarding buildup of radioactive materials is set forth which involves coating at least a portion of the surface of a steel or stainless steel member exposed to the water system of a light water nuclear reactor. The method results in a chromium film of at least 500 Å being deposited upon the inside surfaces of the subject pipes and vessels. The chromium film coated steel member is then installed in the light water type nuclear reactor water system. The level of radioactive byproducts retained on the inside surface of the coated pipes is substantially reduced and worker exposure during routine maintenance of the coolant system is thereby minimized.

A DETAILED DESCRIPTION OF THE INVENTION

The present invention is concerned with coating the internal surfaces of steel members, generally pipes, which are used in the water system of light water nuclear reactors, with a chromium film of at least 500 Å to reduce the amount of Cobalt 59 active corrosion products retained by the piping during normal use. The presently understood source of this cobalt isotope is the corrosion of the underlying steel pipe. Once cobalt from the underlying pipe enters the water coolant system through normal corrosion, it is subjected to conditions which lead to the formation of a radioactive isotope, Cobalt 59.

In order to provide a film on the steel (or stainless) surfaces, the steel should first be prepared to receive the chromium film. The preparation steps typically include degreasing step followed by a brief residence time in the chromium plating bath for approximately 60 seconds prior to the application of current through the plating bath. Another preparation step involves anodic dissolution in the plating bath for approximately 90 seconds with a current density of approximately 40 amps per $dm^2$.

The plating step takes place in a common and well-known plating bath which uses chromic acid ($CrO_3$) and sulfate ($SO_4$), as sulfuric acid. The plating temperature is 50° C. (122° F.) and the current density applied to the plating bath is 40 A/$dm^2$. Under these operating conditions, the current efficiency is claimed to be approximately 15%, which gives a plating speed of approximately 35 μm per hour, that is, 97 Å per second. Depending on local parameters, a deviation of up to 30% should be considered as normal. The thickness of an electrolytically plated layer is proportional to the time when the current density remains constant. However, some delay can be observed at the beginning of the deposition process due to phenomena in the cathodic layer. This delay has no importance in normal deposition where at least a few microns must be plated, but cannot be ignored in the present case.

In order to evaluate this effect, it was decided to perform several tests with plating times ranging from 10 to 60 seconds and to measure the resulting thickness. These measurements were performed using the Auger Electron Spectroscopy technique. The sputtering time required for as thickness of 1,000 Å of chromium was determined on a calibrated sample at the beginning and at the end of each series of measurements. It varied between 15 and 25 minutes from series to series but did not show differences larger than 5% from the beginning and the end of the measurement of samples from the same series. The results are presented in Table 1.

TABLE 1

| Plating Time and Film Thickness | |
|---|---|
| Plating Time (in s) | Thickness (in angstroms) |
| 10 | 900 |
| 20 | 1,900 |
| 30 | 2,850 |
| 60 | not measured |

Figure 1:
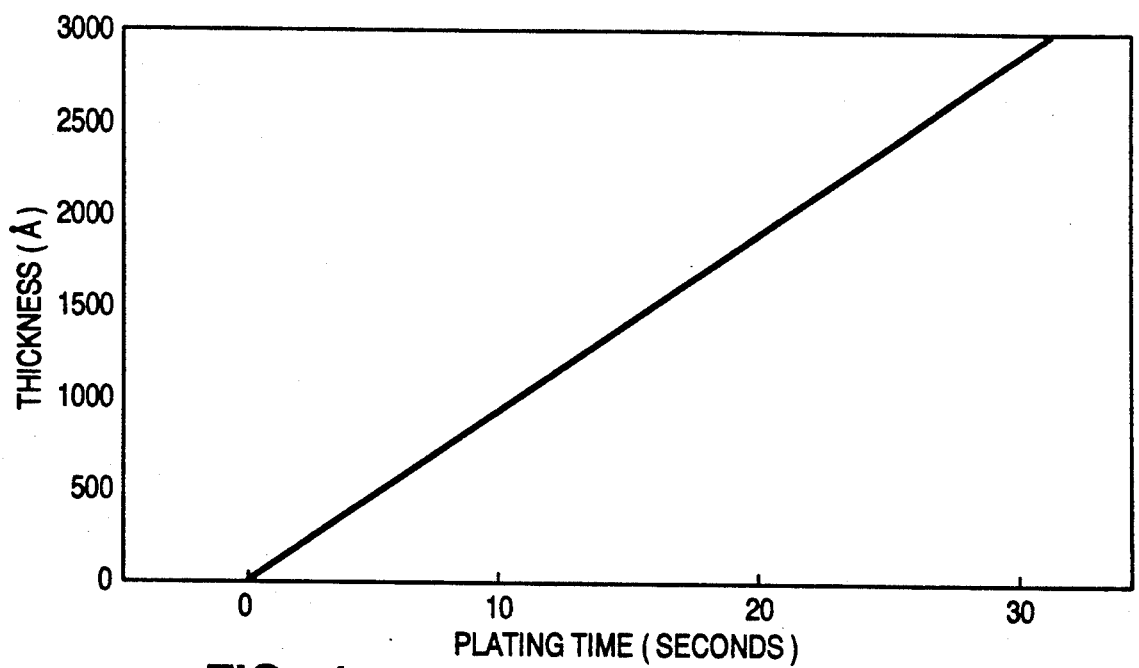
FIG. 1 shows chromium film deposition thickness as a function of plating time in seconds.

Table 1 shows that in the present case, the initial delay is negligible and the deposition rate is 95 Å/second as shown in FIG. 1.

The measurements described in Table 1 were taken at the center of the respective samples. At the periphery, a darker area was observed on the samples plated for 10 and 20 seconds. Beginning in approximately 5 mm from the edge, the thickness of the chromium layer on the first sample was 3200 Å, whereas there was 900 Å thickness at the center. This is a consequence of the edge effect which is especially pronounced for chromium plating.

To decrease the effect of this edge phenomena, several tests were performed using different types of metallic frames surrounding the sample. The best result was obtained with a cylindrical frame, 5 mm in diameter at a distance of 5 mm from the edges. In this case, the darkened area was much less pronounced coming closer to the edges than extended over a 5 mm maximum of smaller chromium thickness was expected on the test piece. As the total current remained the same as for a sample without the frame, a smaller chromium thickness was expected on the test piece. On a 316 steel specimen, the following thicknesses were measured using the Auger Electron Spectroscopy technique for a plating time of 10 seconds on samples at different places. See Table 2.

TABLE 2

| Variation in Chromium Plate Thickness | | | |
|---|---|---|---|
| | SAMPLE | | Thickness |
| No. | Side | Position | (in angstrom) |
| 1 | Front | ¼ of the length half of the width | 600 |
| 2 | Front | ¾ of the length half of the width | 570 |
| 3 | Front | corner, at 7 mm from the edges | 1,300 |
| 4 | Rear | center | 620 |

Figure 2:
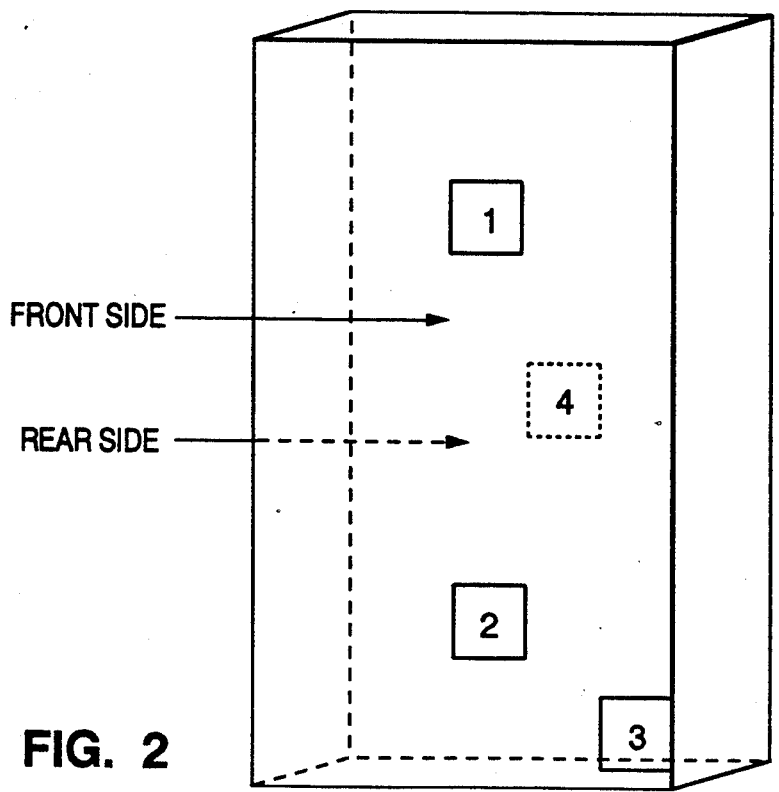
FIG. 2 shows the location of chromium plate thickness measurements corresponding to Table 2 of the specification.

FIG. 2 shows the location of the sample site for each of the measurements reported in Table 2. The constancy of the thickness seems acceptable for the present application. If necessary, the periphery could be removed after exposure of the samples to the primary water.

The chromium plating method of the present invention may be combined with the passivation techniques described in U.S. Pat. No. 4,636,266. Following coating of the surface with chromium, the chromium surface to be passivated is exposed to a gaseous oxygen source. The oxygen source may be oxygen itself, mixtures of oxygen with other gases, e.g., steam air, inert diluents and mixtures of these. It is essential that the oxygen source be in the gas phase and that the exposing step be carried out in the gas phase.

The exposing must take place at a temperature which falls in the range from about 150° C. to 450° C. Preferably, the exposing step will take place at a temperature substantially equal to that of the water temperature within the light water reactor, namely temperatures between 250° C. and 320° C.

The time of exposure is not critical but should be at least five hours. Generally, an exposure time from about 50 hours to about 3000 hours is preferred, although longer times can be used.

The present invention can be used to provide a chromium coating on carbon steels and stainless steels, e.g., 304 stainless, 316 stainless and 347 stainless.

In order to better illustrate the effectiveness of the chromium coating, the following examples are presented.

WORKING EXAMPLES

In June 1989, new and previous fuel cycle test coupons were installed in the steam generator at Doel-2 for activity buildup measurements. The test coupons were placed on the manway seal plates. Table 3 gives the coupon description and position in the steam generator channel head (i.e., hot leg and cold leg).

The plant resumed operation in July, 1989, but an unscheduled shutdown was encountered in November, 1989. Since this was to be an extended shutdown for turbine work, the utility decided to perform a "COMBAT" type decontamination of the primary system. The decontamination consists of recirculating primary coolant with 2500 ppm boron concentration for seven days at a temperature of 120°–140° C.

The utility agreed to drain the steam generator so that the coupons could be analyzed both before and after the decontamination.

The specimens had been exposed for approximately 2500 hours upon plant shutdown. The pre-contamination measurements were made in January, 1990 with the date decay corrected to time of plant shutdown.

After the first measurement, all but one of the specimens were re-installed to undergo the "COMBAT" treatment.

Table 4 and 5 give the results of the gamma spectrographic analyses for the pre and post-"COMBAT" treatment, respectively.

These tables do not show that the palladium coupon also had levels of Sb-124 and AG-110m of the same order of magnitude as the Cobalt 60 values.

TABLE 3

| COUPON SPECIMEN LOADING AT DOEL-2, JUNE, 1989 | | |
|---|---|---|
| ID* | POSITION | STATUS |
| 309L AR | Hot Leg | Second cycle exposure |
| 309L EP/PV | Hot Leg | Second cycle exposure |
| 309L Cr/PV | Hot Leg | New, first cycle exposure |
| CF8M AR | Hot Leg | Second cycle exposure |
| CF8M EP/PV | Hot Leg | Second cycle exposure |
| CF8M Cr/PV | Hot Leg | New, first cycle exposure |
| 316L Cr/PV | Hot Leg | New, first cycle exposure |
| 4PP1 | Hot Leg | Second cycle exposure |
| 309L AR | Cold Leg | Second cycle exposure |
| 309L EP/PV | Cold Leg | Second cycle exposure |
| 309L Cr/PV | Cold Leg | New, first cycle exposure |
| CF8M AR | Cold Leg | Second cycle exposure |
| CF8M EP/PV | Cold Leg | Second cycle exposure |
| CF8M Cr/PV | Cold Leg | New, first cycle exposure |
| 316L Cr/PV | Cold Leg | New, first cycle exposure |
| PD A-304 | Cold Leg | Second cycle exposure |

*AR = As received, EP = electropolished, P/V = RCT Passivation, Cr = Chromium deposition layer applied, PP and PD = Palladium coated.

TABLE 4

DOEL-2 COUPON ANALYSIS, PRE-DECONTAMINATION, APPROXIMATELY 2500 HOURS EXPOSURE, JAN 1990.

| IDENTIFICATION | CONTACT DOSERATE (mR/hr) | MEASURED ACTIVATION PRODUCTS (DECAY CORRECTED) | | |
|---|---|---|---|---|
| | | Co-58 | Co-60 | Mn-54 |
| HOT LEG | | | | |
| 309L AR | 180 | 5.11E + 5 | 6.43E + 4 | 1.27E + 4 |
| 309L EP/PV | 120 | 3.89E + 5 | 4.59E + 4 | 9.42E + 3 |
| 309L Cr/PV | 30 | 4.62E + 4 | 5.23E + 3 | 1.24E + 3 |
| CF8M AR | 310 | 9.87E + 5 | 1.26E + 5 | 2.47E + 4 |
| CF8M EP/PV | 160 | 5.29E + 5 | 6.64E + 4 | 1.49E + 4 |
| CF8M Cr/PV | 26 | 5.11E + 4 | 5.71E + 3 | 1.24E + 3 |
| 316L Cr/PV | 34 | 5.41E + 4 | 5.32E + 3 | 9.99E + 2 |
| 4PP 1 | 210 | 1.78E + 5 | 2.60E + 4 | 5.46E + 3 |
| COLD LEG | | | | |
| 309L AR | 200 | 5.12E + 5 | 8.59E + 4 | 1.05E + 4 |
| 309L EP/PV | 135 | 4.25E + 5 | 5.02E + 4 | 7.72E + 3 |
| 309L Cr/PV | 24 | 5.21E + 4 | 5.08E + 3 | 6.68E + 2 |
| CF8M AR | 300 | 6.36E + 5 | 1.07E + 5 | 1.18E + 4 |
| CF8M EP/PV | 200 | 5.20E + 5 | 6.94E + 4 | 7.86E + 3 |
| CF8M Cr/PV | 180* | 3.94E + 4 | 7.19E + 3 | 1.80E + 3 |
| 316L Cr/PV | 28 | 2.74E + 4 | 3.68E + 3 | 4.04E + 2 |
| PD A - 304 | 240 | 2.65E + 5 | 5.51E + 4 | 6.25E + 4 |

*APPARENTLY MISREADING, SHOULD BE 18 mR/hr

TABLE 5

DOEL-2 COUPON ANALYSIS, PRE-DECONTAMINATION, APPROXIMATELY 2500 HOURS EXPOSURE, FEB 1990.

| IDENTIFICATION | CONTACT DOSERATE (mR/hr) | MEASURED ACTIVATION PRODUCTS (DECAY CORRECTED) | | |
|---|---|---|---|---|
| | | Co-58 | Co-60 | Mn-54 |
| HOT LEG | | | | |
| 309L AR | 140 | 2.77E + 5 | 6.27E + 4 | 1.23E + 4 |
| 309L EP/PV | 90 | 1.95E + 5 | 4.47E + 4 | 6.78E + 3 |
| 309L Cr/PV | 17 | 1.76E + 4 | 3.71E + 3 | 6.43E + 2 |
| CF8M AR | 210 | 5.43E + 5 | 1.22E + 5 | 1.86E + 4 |
| CF8M EP/PV | 110 | 2.07E + 5 | 4.77E + 4 | 8.36E + 3 |
| CF8M Cr/PV | 15 | 1.85E + 4 | 3.97E + 3 | 6.39E + 2 |
| 316L Cr/PV | 14 | 2.28E + 4 | 4.27E + 3 | 9.58E + 2 |
| 4PP 1 | 210 | 9.70E + 4 | 2.49E + 4 | 3.14E + 3 |
| COLD LEG | | | | |
| 309L AR | 200 | 2.99E + 5 | 8.05E + 4 | 8.50E + 3 |
| 309L EP/PV | 90 | 2.00E + 5 | 4.42E + 4 | 5.33E + 3 |
| 309L Cr/PV | 15 | 3.11E + 4 | 4.44E + 3 | 6.77E + 2 |
| CF8M AR | 180 | 3.25E + 5 | 1.02E + 5 | 8.46E + 3 |
| CF8M EP/PV | 140 | 2.70E + 5 | 6.28E + 4 | 6.32E + 3 |
| CF8M Cr/PV | 15 | 2.51E + 4 | 3.91E + 3 | 5.47E + 2 |
| 316L Cr/PV | 10 | 1.47E + 4 | 2.72E + 3 | 4.27E + 2 |
| PD A - 304 | 220 | 1.39E + 5 | 4.53E + 4 | 3.90E + 3 |

Table 4 shows the pre-decontamination data normalized to the appropriate material. It should be noted that in this table, that the 316L stainless steel and palladium coated coupons were normalized to the 309L coupon data.

Table 5 shows the effectiveness of the decontamination.

All coupons were re-installed for further exposure in the plant.

TABLE 6

DOEL-2 COUPON ANALYSIS, PRE-DECONTAMINATION, JANUARY 1990 DATA-NORMALIZED.

| COUPON IDENTIFICATION | CONTACT DOSERATE (mR/hr) | NORMALIZED ACTIVATION PRODUCTS (TO AR FOR SPECIFIC MATERIAL) | | |
|---|---|---|---|---|
| | | Co-58 | Co-60 | Mn-54 |
| HOT LEG | | | | |
| 309L EP/PV | 0.67 | 0.76 | 0.71 | 0.74 |
| 309L Cr/PV | 0.17 | 0.09 | 0.08 | 0.10 |
| F8M EP/PV | 0.54 | 0.53 | 0.60 | |
| CF8M Cr/PV | 0.08 | 0.05 | 0.05 | 0.05 |
| 316L Cr/PV* | 0.19 | 0.11 | 0.08 | 0.08 |
| 4PP 1* | 1.17 | 0.35 | 0.40 | 0.43 |
| COLD LEG | | | | |
| 309L EP/PV | 0.68 | 0.83 | 0.58 | 0.74 |
| 309L Cr/PV | 0.12 | 0.10 | 0.06 | 0.07 |

TABLE 6-continued

DOEL-2 COUPON ANALYSIS, PRE-DECONTAMINATION, JANUARY 1990 DATA-NORMALIZED.

| COUPON IDENTIFICATION | CONTACT DOSERATE (mR/hr) | NORMALIZED ACTIVATION PRODUCTS (TO AR FOR SPECIFIC MATERIAL) | | |
|---|---|---|---|---|
| | | Co-58 | Co-60 | Mn-54 |
| CF8M EP/PV | 0.67 | 0.82 | 0.65 | 0.67 |
| CF8M Cr/PV | 0.60 | 0.06 | 0.07 | 0.15 |
| 316L Cr/PV* | 0.14 | 0.05 | 0.05 | 0.04 |
| PD A - 304* | 1.20 | 0.52 | 0.64 | 5.95 |

316L & Pd DATA NORMALIZED TO 309L

TABLE 7

DOEL-2 COUPON ANALYSIS, PRE-DECONTAMINATION, JANUARY 1990 DATA-NORMALIZED.

| COUPON IDENTIFICATION | CONTACT DOSERATE (mR/hr) | MEASURED ACTIVATION PRODUCTS (TO AR FOR SPECIFIC MATERIAL) | | |
|---|---|---|---|---|
| | | Co-58 | Co-60 | Mn-54 |
| HOT LEG | | | | |
| 309L EP/PV | 1.3 | 2.0 | 1.0 | 1.4 |
| 309L Cr/PV | 1.8 | 2.6 | 1.4 | 1.9 |
| CF8M AR | 1.5 | 1.8 | 1.0 | 1.3 |
| CF8M EP/PV | 1.5 | 2.5 | 1.4 | 1.8 |
| CF8M Cr/PV | 1.7 | 2.8 | 1.4 | 1.9 |
| 316L Cr/PV* | 2.4 | 2.4 | 1.2 | 1.0 |
| 4PP 1* | 1.0 | 1.8 | 1.0 | 1.7 |
| COLD LEG | | | | |
| 309L AR | 1.0 | 1.7 | 1.1 | 1.2 |
| 309L EP/PV | 1.5 | 2.1 | 1.1 | 1.4 |
| 309L Cr/PV | 1.6 | 1.7 | 1.1 | 1.0 |
| CF8M AR | 1.7 | 2.0 | 1.1 | 1.4 |
| CF8M EP/PV | 1.4 | 1.9 | 1.1 | 1.2 |
| CF8M Cr/PV | 1.2 | 1.6 | 1.8 | 3.3 |
| 316L Cr/PV | 2.8 | 0.2 | 1.4 | 0.9 |
| PD A - 304 | 1.1 | 1.9 | 1.2 | 16.0 |
| AVERAGE, HOT LEG | 1.6 | 2.3 | 1.2 | 1.6 |
| AVERAGE, COLD LEG | 1.5 | 1.6 | 1.2 | 3.3 |

Figure 3:
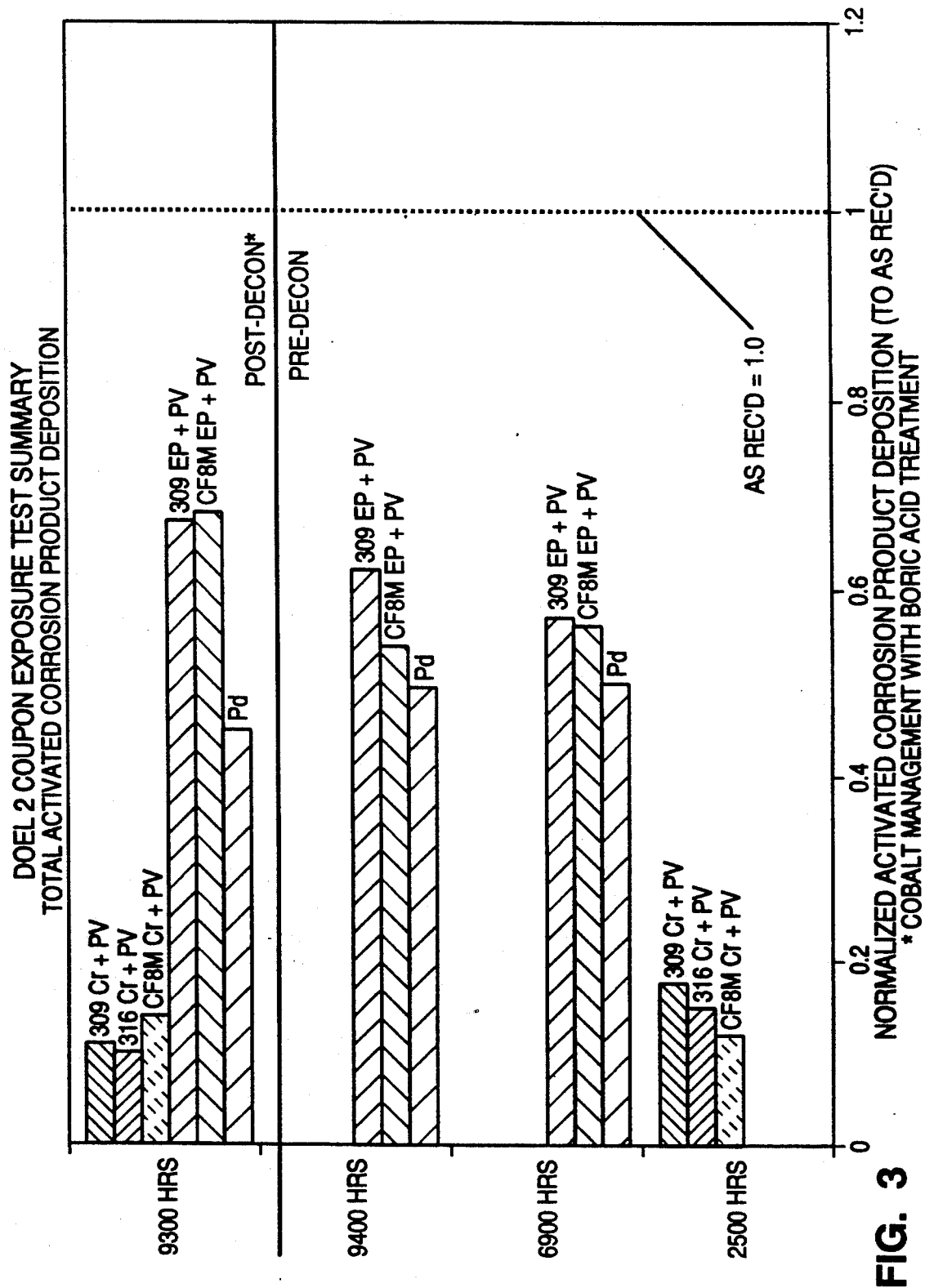
FIG. 3 is a plot showing corrosion product deposition versus hours of exposure and coupon material.
Figure 4:
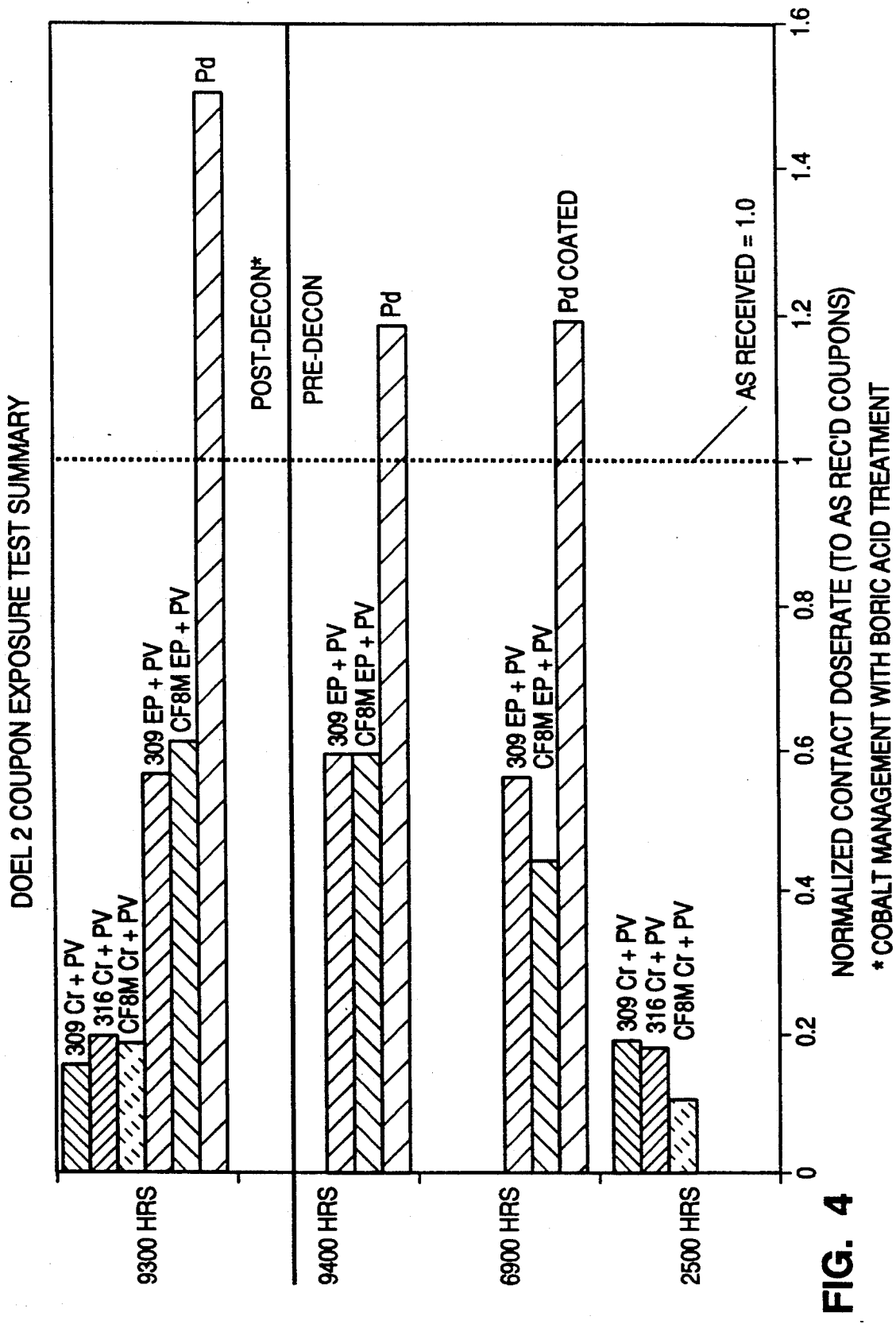
FIG. 4 is a plot showing normalized contact doserate versus hours of exposure and coupon material.

As shown graphically in FIGS. 3 and 4, the coupons coated with a chromium film and then passivated show very low activity deposition after a few months of exposure.

The combination of electropolishing and RCT passivation show a 25 to 50% benefit in activity buildup over the long term.

The palladium coated specimen have high doserates and more radionuclides observed than any of the other coupons.

The 9300 hour data show that chromium coating followed by passivation represents a four to five times increase in effectiveness over steel passivation without chromium based upon corrosion product deposition. This effectiveness is reduced to two to three times when based on doserate.

We claim:

1. A method for retarding buildup of radioactive materials on a water exposed steel surface of a pipe which forms a part of a water system of a light water nuclear reactor, comprising the steps of:
   preparing said water exposed steel surface to obtain a clean base metal starting surface;
   depositing a chromium film at least five hundred Angstroms thick on said pipe surface from a solution of chromic acid and sulfuric acid under controlled electrochemical deposition conditions;
   exposing said deposited chromium film and said underlying base metal to a gaseous oxygen source at temperatures between 150° C. and 450° C. to obtain a thin stabilized chromium-rich oxide film on the exposed surface of said deposited chromium film; and,
   using said chromium-coated pipe with an oxide film as a portion of the water system of the light water nuclear reactor.

2. A method as in claim 1 wherein said oxygen source comprises air.

3. A method as in claim 1 wherein said oxygen source further comprises a minor amount of water vapor.

* * * * *